(12) United States Patent
Chen et al.

(10) Patent No.: US 11,000,766 B2
(45) Date of Patent: May 11, 2021

(54) VIDEO RECORDING METHOD BASED ON VIRTUAL REALITY APPLICATION, TERMINAL DEVICE, AND STORAGE MEDIUM

(71) Applicant: Tencent Technology (Shenzhen) Company Limited, Shenzhen (CN)

(72) Inventors: Yang Chen, Shenzhen (CN); Yuchuan Huang, Shenzhen (CN); Xiaobin Shen, Shenzhen (CN); Weiqiang Mai, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/588,506

(22) Filed: Sep. 30, 2019

(65) Prior Publication Data
US 2020/0023276 A1    Jan. 23, 2020

Related U.S. Application Data

(63) Continuation of application No. PCT/CN2017/098865, filed on Aug. 24, 2017.

(51) Int. Cl.
*A63F 13/497*    (2014.01)
*A63F 13/211*    (2014.01)
(Continued)

(52) U.S. Cl.
CPC .......... *A63F 13/497* (2014.09); *A63F 13/211* (2014.09); *A63F 13/60* (2014.09);
(Continued)

(58) Field of Classification Search
CPC ...... A63F 13/211; A63F 13/497; A63F 13/92; A63F 13/60; G06F 3/011; G06F 3/0304; G06T 19/006
See application file for complete search history.

(56) References Cited

U.S. PATENT DOCUMENTS 9,573,062 B1    2/2017  Long et al.
9,616,338 B1    4/2017  Hooper et al.
(Continued)

FOREIGN PATENT DOCUMENTS

CN    101247481 A    8/2008
CN    105915766 A    8/2016
(Continued)

OTHER PUBLICATIONS

Tencent Technology, ISR, PCT/CN2017/098865, Mar. 27, 2018, 3pgs.

(Continued)

*Primary Examiner* — Steve Rowland
(74) *Attorney, Agent, or Firm* — Morgan, Lewis & Bockius LLP

(57) ABSTRACT

This application provides a method for recording interactions of a virtual role of a target virtual object with other virtual objects in a virtual reality application from a third person perspective view. The method includes: configuring a third person perspective view, the third person perspective view being a video shooting perspective view of a virtual controller; obtaining location information of the virtual role in the virtual reality application; obtaining current orientation information of the third person perspective view, which is orientation information of the third person perspective view virtual camera in the virtual reality application; obtaining, according to the location information of the virtual role and the current orientation information of the third person perspective view, scene data corresponding to the virtual reality application in which the virtual role is currently located; and capturing and displaying actions of the target virtual object according to the scene data.

20 Claims, 11 Drawing Sheets

(51) Int. Cl.
- *A63F 13/60* (2014.01)
- *A63F 13/92* (2014.01)
- *G06F 3/01* (2006.01)
- *G06F 3/03* (2006.01)
- *G06T 19/00* (2011.01)

(52) U.S. Cl.
CPC .............. *A63F 13/92* (2014.09); *G06F 3/011* (2013.01); *G06F 3/0304* (2013.01); *G06T 19/006* (2013.01)

(56) References Cited

U.S. PATENT DOCUMENTS

| | | |
|---|---|---|
| 2013/0069804 A1 | 3/2013 | Han et al. |
| 2016/0067608 A1* | 3/2016 | Yim ................. A63F 13/44 463/33 |
| 2016/0361658 A1* | 12/2016 | Osman ................ A63F 13/355 |
| 2017/0103571 A1 | 4/2017 | Beaurepaire |
| 2017/0249785 A1* | 8/2017 | Hooper ............... A63F 13/335 |
| 2017/0266554 A1* | 9/2017 | Marks ............... A63F 13/5255 |
| 2017/0269685 A1* | 9/2017 | Marks ............... A63F 13/212 |
| 2017/0269713 A1* | 9/2017 | Marks ............... G06F 3/0346 |
| 2017/0354875 A1* | 12/2017 | Marks ............... A63F 13/52 |
| 2018/0093185 A1* | 4/2018 | Black ............... A63F 13/5375 |
| 2018/0096519 A1* | 4/2018 | Tokubo ............. A63F 13/211 |
| 2018/0311585 A1* | 11/2018 | Osman ............... A63F 13/40 |

FOREIGN PATENT DOCUMENTS

| | | |
|---|---|---|
| CN | 106131530 A | 11/2016 |
| CN | 106412555 A | 2/2017 |
| CN | 205987196 U | 2/2017 |
| CN | 106843456 A | 6/2017 |
| CN | 103942384 A | 7/2017 |
| CN | 106980369 A | 7/2017 |
| JP | 2008259154 A | 10/2008 |

OTHER PUBLICATIONS

Tencent Technology, WO, PCT/CN2017/098865, Mar. 27, 2018, 3 pgs.
Tencent Technology, IPRP, PCT/CN2017/098865, Feb. 25, 2020, 4 pgs.
Extended European Search Report, EP17922767.3, dated Feb. 17, 2021, 8 pgs.

* cited by examiner

US 11,000,766 B2

VIDEO RECORDING METHOD BASED ON VIRTUAL REALITY APPLICATION, TERMINAL DEVICE, AND STORAGE MEDIUM

CROSS-REFERENCE TO RELATED APPLICATIONS

This application is a continuation application of PCT/CN2017/098865, entitled "VIDEO RECORDING METHOD BASED ON VIRTUAL REALITY APPLICATION, TERMINAL DEVICE, AND STORAGE MEDIUM" filed on Aug. 24, 2017, which is incorporated by reference in its entirety.

FIELD OF THE TECHNOLOGY

This application relates to the field of virtual reality technologies, and in particular, to a video recording method based on a virtual reality application, a terminal device, and a storage medium.

BACKGROUND OF THE DISCLOSURE

With the rapid increase of the personal computer (PC) virtual reality (VR) market and users in recent years, requirements of the users for VR recording are increasing, and especially, the users want to shoot scenes in which the users are playing VR games. To shoot the scenes in which the users are playing VR games, a shooting manner of a third person perspective view is currently mainly used to shoot a real posture of a user, and then a final video is obtained by synthesizing a shot user real posture picture, a first person perspective view picture shot by a VR helmet, and a game scene of the user in the VR game at each posture.

However, current shooting of the third person perspective view can only rely on a physical handle, and the physical handle may become unstable due to a reason of artificial control, and finally, as a result, a synthesized video jitters, and video quality is poor. Secondly, the shooting of the third person perspective view is also limited by the physical handle, and a desired picture cannot be shot in a larger range.

SUMMARY

This application provides a video recording method based on a virtual reality application, a terminal device, and a storage medium, to resolve a problem in the existing technology that shooting of a third person perspective view is limited by hardware.

One aspect of this application provides a video recording method based on a virtual reality application, the method being used for recording interactions of a virtual role of a target virtual object with other virtual objects in the virtual reality application from a third person perspective view in the virtual reality application and performed at a computing device having one or more processors and memory storing programs to be executed by the one or more processors, and the video recording method comprising:

configuring a third person perspective view of a target virtual object, the third person perspective view being a video shooting perspective view of a virtual controller configured as a third person perspective view virtual camera of the virtual reality application;

obtaining location information of the virtual role in the virtual reality application;

obtaining current orientation information of the third person perspective view, the current orientation information of the third person perspective view being orientation information of the third person perspective view virtual camera in the virtual reality application;

obtaining, according to the location information of the virtual role and the current orientation information of the third person perspective view, scene data corresponding to the virtual reality application in which the virtual role is currently located; and capturing and displaying actions of the target virtual object in the virtual reality application according to the scene data.

Another aspect of this application provides a computing device for recording interactions of a virtual role of a target virtual object with other virtual objects in a virtual reality application from a third person perspective view in the virtual reality application, the computing device comprising one or more processors, memory coupled to the one or more processors and a plurality of programs stored in the memory that, when executed by the one or more processors, cause the computing device to perform the aforementioned video recording method.

Still another aspect of this application provides a non-transitory computer readable storage medium storing a plurality of machine readable instructions for recording interactions of a virtual role of a target virtual object with other virtual objects in a virtual reality application from a third person perspective view in the virtual reality application in connection with a computing device having one or more processors, wherein the plurality of machine readable instructions, when executed by the one or more processors, cause the computing device to perform the aforementioned video recording method.

Compared with the existing technology, in the solution provided in this application, the virtual controller for shooting the video from the third person perspective view first obtains the location information and the current orientation information of the third person perspective view, obtains the scene data according to the location information and the current orientation information of the third person perspective view, and then shoots the video according to the scene data, the current orientation information of the third person perspective view, and posture data of the virtual role. It can be learned that after the solution is used, on one hand, the video may be shot through the virtual controller without being additionally equipped with a hand-held controller, and on the other hand, the video from the third person perspective view may be omni-directionally shot without involving extra labor and devices and not being limited to physical hardware.

DESCRIPTION OF EMBODIMENTS

In the specification, claims, and accompanying drawings of this application, the terms "first", "second", and so on are intended to distinguish between similar objects rather than indicating a specific order. It should be understood that data used in this way can be interchanged in an appropriate case, so that the embodiments that are described herein can be implemented in a sequence other than content illustrated or described herein. Moreover, the terms "include", "contain" and any other variants mean to cover the non-exclusive inclusion. For example, a process, method, apparatus, product, or device that includes a series of steps or modules is not necessarily limited to those steps or modules that are expressly listed, but may include other steps or modules not expressly listed or inherent to such a process, method, product, or device. Module division appearing in this application is merely logical division and may be other division during implementation in actual application. For example, a plurality of modules may be combined or integrated into another apparatus, or some features may be ignored or not performed. In addition, the displayed or discussed mutual coupling, or direct coupling, or communication connections may be implemented through some interfaces. Indirect coupling or communication connections between the modules may be implemented in electric or other forms. This is not limited in this application. In addition, the modules or sub-modules described as separation parts may be or may not be physically separated, or may be or may not be physical modules, or may be distributed to a plurality of circuit modules. Some or all of the modules may be selected according to actual requirements to achieve the objective of the solutions of this application.

This application provides a video recording method based on a virtual reality application, a terminal device, and a storage medium, used in the field of virtual reality technologies. Detailed descriptions are provided below.

Figure 1:
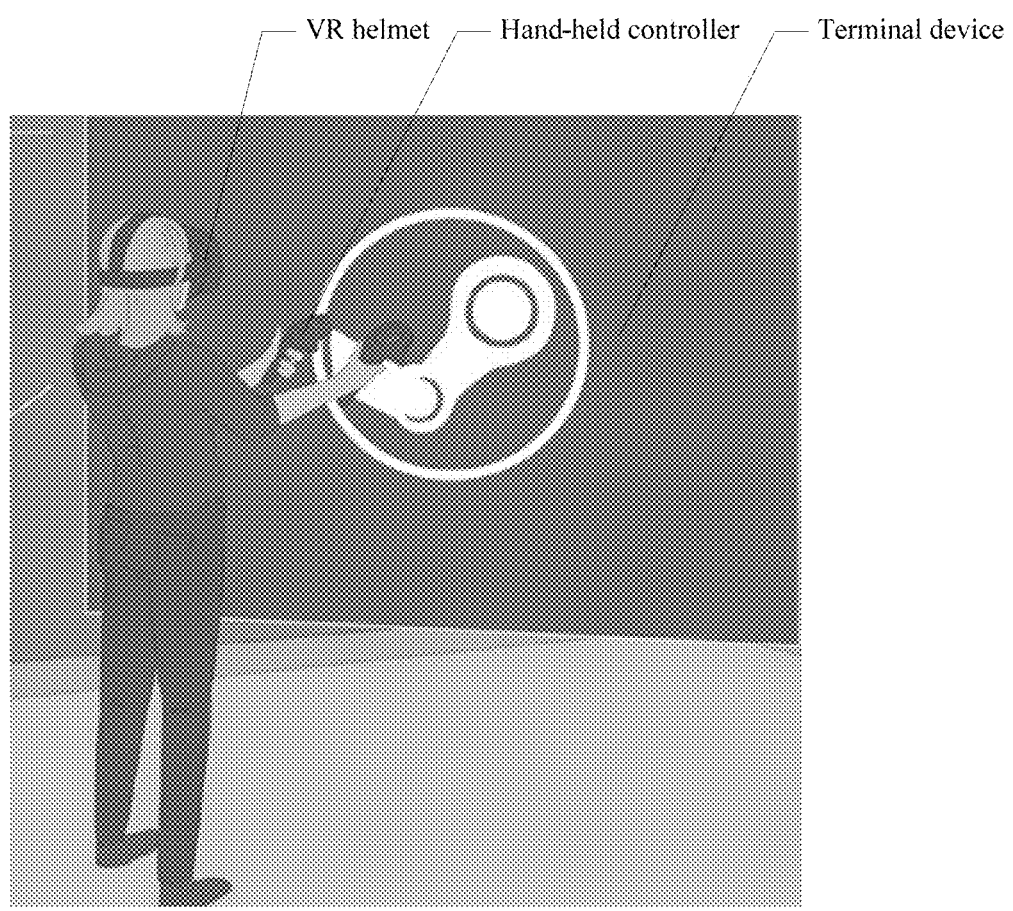
FIG. 1 is a schematic diagram showing that a user interacts with a VR application by using a virtual reality system in an embodiment of the present application.

As shown in FIG. 1, a whole virtual reality system includes a VR helmet, a terminal device in which a VR resource (for example, a VR game) and/or a VR application, software, an App, and the like are installed, and two hand-held controllers. In a preferred embodiment of this application, to increase convenience and universality of a whole virtual reality system configuration, the hand-held controller may be a hand-held controller with a standard configuration. The terminal device is not limited to a conventionally used personal computer and notebook computer, or may be a similar electronic terminal, apparatus, or device that has a VR resource, an application, software, and the like and that carries a running function. A user wears a VR helmet when participating in a VR application. The VR helmet is a head-mounted display. The VR helmet is, through a human-machine interaction interface, in communication connection with a computer in which a VR game is installed. The user participates in the VR application at a first person perspective view and controls props in the VR application in the VR application.

In this embodiment of this application, the VR application in the terminal device may be run based on a Steam VR platform. To get rid of limitation of physical hardware, an application plug-in may be loaded in a VR resource of the terminal device, to achieve a recording function of a third person perspective view. Specifically, the application plug-in may be loaded in the VR application by configuring the VR application, so that the application plug-in can simulate a third person perspective view virtual camera in the VR application. When the user wears the VR helmet to play the VR application, the user may start the third person perspective view recording function of the third person perspective view virtual camera in the application plug-in on a computer. In this way, when the user plays the VR application, a posture and a scene of a virtual role of the VR application that the user is identified as in the VR application may be recorded through the application plug-in.

The VR application is an interactive application that comprehensively uses a computer graphics system and various interface devices such as reality and control and that provides an immersive feeling in an interactive three-dimensional environment generated on a computer. The interactive three-dimensional environment generated on a computer becomes a virtual environment (VE). The VR application may provide a human-machine interface to the user, so that the user can instruct a VR apparatus in which a VR application is installed, and instruct the VR apparatus how to provide information to the user.

In this embodiment of this application, the virtual role is a virtual role in the VR application that the user needs to be identified as when the user interacts with the VR application. The first person perspective view is a user perspective view at which a user controlling the VR application cannot see a virtual role that the user is identified as but can see a scene in which the virtual role that the user is identified as, so that the user can be immersive. The third person perspective view is a perspective view at which the virtual role that the user is identified as and an interaction scene in which the virtual role is located can be seen.

In some implementations, the terminal device may include an input/output unit, a virtual controller, a perspective view controller, and a configurer. The virtual controller, the perspective view controller, and the configurer are a part of the foregoing application plug-in, and the virtual controller, the perspective view controller, and the configurer are all computer program products and are not limited by physical hardware.

The configurer may be configured to detect and configure a Steam VR platform, so that the Steam VR platform identifies and loads the virtual controller, so that the virtual controller simulates a VR physical handle, configured to adjust a perspective view location and a perspective view direction of the third person perspective view and configured to record a video at the third person perspective view in the VR application.

The configurer is further configured to configure the VR application, so that the VR application accepts the virtual controller as the third person perspective view virtual camera. The Steam VR platform is an open VR technical platform based on Open VR standards.

The perspective view controller provides a user interface (UI), so that the user can adjust the perspective view orientation and the perspective view location of the virtual controller in real time and conveniently.

Figure 2:
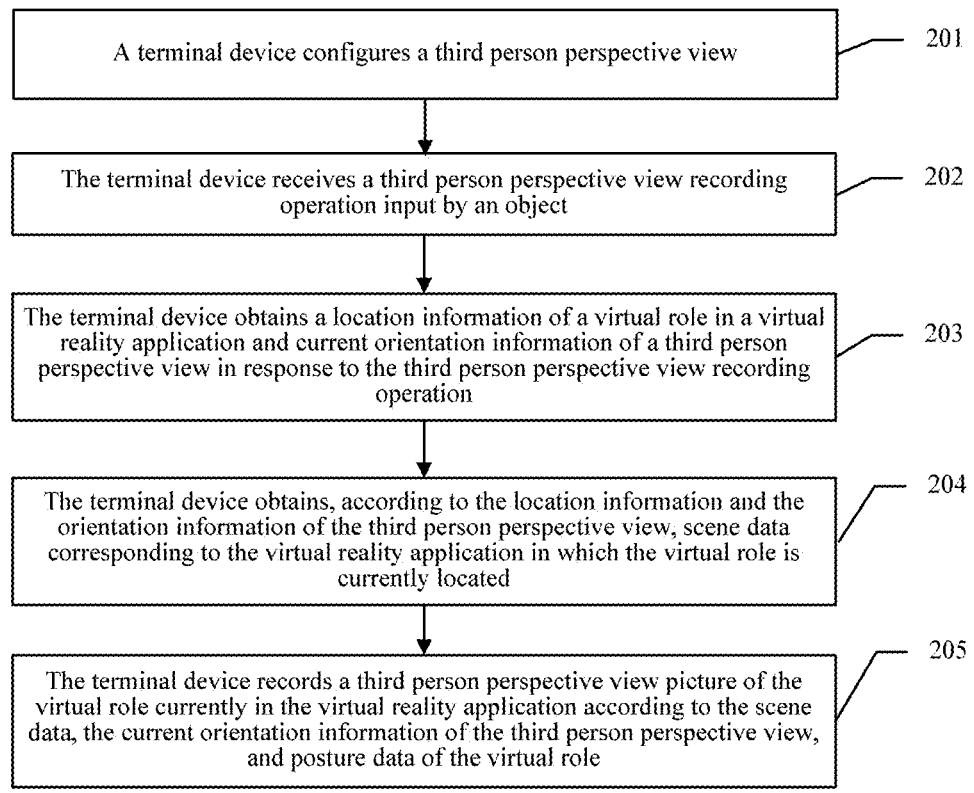
FIG. 2 is a schematic flowchart of a video recording method based on a virtual reality application in an embodiment of the present application.

Referring to FIG. 2, the following describes the video recording method based on a virtual reality application in this application by way of example. The method may be used for recording interactions of a virtual role of a target virtual object with other virtual objects in the virtual reality application from the third person perspective view of the virtual reality application. The virtual reality application is an interactive application, for example, a virtual reality game. The user may enter an actual game scene by wearing the VR helmet and obtain interactive experience such as senses and touch in the game scene.

The virtual role is a role of an object in the virtual reality application that interacts with the virtual reality application. For example, the virtual role may be a user participating in a VR game. When participating in the VR game, the user needs to be identified as a role in the VR game. The VR game may include a plurality of game scenes. Each game scene includes one or more virtual objects. The virtual object may be a room, a road, a tree, a building, a car, and the like. These game scenes may be referred to as materials. This embodiment of this application mainly includes:

201: A terminal device configures a third person perspective view.

The third person perspective view is a video shooting perspective view of a virtual controller configured as a third person perspective view virtual camera of the virtual reality application.

202: The terminal device receives a third person perspective view recording operation input by an object.

The object is a user of the terminal that interacts with other objects in the virtual reality application. For example, the object may be a user that wears a VR helmet to interact with the VR application in the terminal device in FIG. 1.

203: The terminal device obtains location information of a virtual role of a virtual object associated with the user in the virtual reality application and current orientation information of a third person perspective view in response to the third person perspective view recording operation.

The location information may be a location at which a virtual role in the VR game that the user is identified as a virtual object located in the VR game. For example, the location information may be a room, a road, or the like of the VR game.

The third person perspective view is the video shooting perspective view of the virtual controller configured as the third person perspective view virtual camera of the virtual reality application.

The current orientation information of the third person perspective view is orientation information of the third person perspective view virtual camera currently in the virtual reality application. The current orientation information may be initially configured orientation information or orientation information adjusted in a process of recording the video. If the current orientation information is the adjusted orientation information, currently, the third person perspective view virtual camera shoots the video that is shot according to the adjusted orientation information.

It should be noted that time sequences of obtaining of the location information and the current orientation information of the third person perspective view are not limited in this application. Before the terminal device responds to the third person perspective view recording operation, the terminal device also needs to configure the virtual reality application, so that the virtual reality application uses the virtual controller as the third person perspective view virtual camera. For example, when the user is playing the VR game, the user clicks the third person perspective view recording operation on a PC, and then the PC starts a function of using the virtual controller as the third person perspective view virtual camera, to shoot the video from third person perspective view in the VR game through the third person perspective view virtual camera. The video from the third person perspective view includes a posture of the virtual role, to record a scene in which the user plays the VR game.

204: The terminal device obtains, according to the location information of the virtual role and the current orientation information of the third person perspective view, scene data corresponding to the virtual reality application in which the virtual role is currently located.

The scene data may be a picture material that the virtual reality application currently presents. For example, the scene data may be a game scene in the VR game. The terminal device may determine a game scene a of the virtual role currently in the VR game according to a location of the virtual role in the VR game.

205: The terminal device generates a video of the virtual role in the virtual reality application according to the scene data, the current orientation information of the third person perspective view, and posture data of the virtual role, the posture data including the interactions of the virtual role with the other virtual objects in the virtual reality application.

The posture data of the virtual role is posture data embodied when the user interacts with the virtual reality application. For example, the posture data may be data that is input into the terminal device by shaking a physical handle when the user plays the VR game. The posture data may be obtained through a sensor. A specific obtaining manner is not limited in this application. It should be noted that time sequences of obtaining of the location information, the current orientation information of the third person perspective view, and the posture data of the virtual role are not limited in this application provided that it is ensured that the posture data of the virtual role is obtained before the current third person perspective view video of the virtual role in the virtual reality application is recorded.

Specifically, the third person perspective view virtual camera shoots the current third person perspective view video of the virtual role in the virtual reality application. In an actual operation, scene data shot according to the orientation information may be obtained according to the scene data and the current orientation information of the third person perspective view, and then the scene data shot according to the orientation information and the posture data are synthesized, to obtain a final third person perspective view video.

In some implementations, the terminal device may be further configured in a manner in which the orientation information of the third person perspective view virtual camera changes as the location of the virtual role changes. In this way, when the location information of the virtual role in the virtual reality application changes, the third person perspective view camera may move with the virtual role, to shoot the virtual role in the virtual reality application by following. In this way, the object may enjoy an interaction scene of being identified in the virtual reality application or may provide an interaction scene to other users for watching.

Compared with an existing mechanism, in the solution provided in this application, the virtual controller for shooting the third person perspective view video first obtains the location information and the current orientation information of the third person perspective view, obtains the scene data according to the location information and the current orientation information of the third person perspective view, and then shoots the third person perspective view video according to the scene data, the current orientation information of the third person perspective view, and posture data of the virtual role. It can be learned that after the solution is used, on one hand, the third person perspective view video may be shot through the virtual controller without being additionally equipped with a hand-held controller, and on the other hand, the third person perspective view video may be ominidirectionally shot without involving extra labor and devices and not being limited to physical hardware.

On the other hand, when the VR game is shot, no photographer that has experience in shooting mixed reality is needed to continuously adjust a shooting orientation according to a game process and a player location in a shooting process, but a common player can independently complete the whole operation. A player does not need to synchronously set a green-screen environment and video synchronization, and superpose videos after shooting is completed. It can be known from the above that in the solution of this application, a threshold for players can be lowered, and a whole process of obtaining a video shooting time can be simplified.

Optionally, in some embodiments of the invention, after the generating the current third person perspective view video of the virtual role in the virtual reality application, the method further includes:

receiving a first adjustment operation; and adjusting the orientation information of the third person perspective view according to a first orientation parameter input by the first adjustment operation, to control displacement and rotation of the third person perspective view virtual camera in the virtual reality application.

Optionally, in some embodiments of the invention, the method further includes:

receiving a second adjustment operation, the second adjustment operation being an adjustment operation of a field of view (FOV) of the third person perspective view; and adjusting a field of view of the virtual controller according to a first instruction input by the second adjustment operation, the field of view being a perspective view range for the third person perspective view virtual camera to shoot the third person perspective view video. It can be learned that in this application, when the field of view is adjusted, it is not limited by physical hardware, and the field of view may be randomly increased or decreased, to obtain an appropriate visual field effect.

Optionally, in some embodiments of the invention, the method further includes:

receiving a third adjustment operation; and setting the orientation information of the third person perspective view to a fixed value according to the third adjustment operation, to inhibit picture jitter of the third person perspective view. Through this fixed setting, static shooting of the third person perspective view can be achieved. For a virtual reality application that is not suitable for being shot at the first person perspective view or a shooting effect causes eyes of a viewer to be uncomfortable due to jitter, shooting may be performed by selecting a static third person perspective view.

Optionally, in some embodiments of the invention, the orientation information includes a perspective view location and a perspective view orientation. An object corresponding to the virtual role may wear a virtual reality helmet and may shoot the first person perspective view picture based on a perspective view orientation of the virtual reality helmet.

The method further includes:

binding the perspective view orientation of the third person perspective view and a perspective view orientation of a virtual reality helmet in response to the third person perspective view configuration operation, so that the perspective view orientation of the third person perspective view changes as the perspective view orientation of the virtual reality helmet changes, to obtain a first person perspective view picture, the first person perspective view picture being a picture within a field of view shot by the third person perspective view virtual camera when the virtual role is at a location indicated by the location information. It can be learned that in this application, a function of using the third person perspective view as the first person perspective view can be implemented through binding.

Specifically, the perspective view orientation of the third person perspective view and the perspective view orientation of the virtual reality helmet are bound, so that the perspective view orientation of the third person perspective view changes as the perspective view orientation of the virtual reality helmet changes, and the perspective view orientation of the third person perspective view is kept consistent with the perspective view orientation of the virtual reality helmet. In this way, a picture shot by the virtual reality helmet is a first person perspective view picture shot at the first person perspective view. In this way, the first person perspective view can be shot by controlling shooting of the third person perspective view. In addition, a wider visual field may be achieved by adjusting the FOV of the third person perspective view and is wider than a picture visual field shot by a helmet at the same perspective view orientation. For example, a user originally wearing the virtual reality helmet may see 130° of a picture, while the virtual reality helmet shoots only 110° of a picture that the user sees. After the perspective view orientation of the third person perspective view and the perspective view orientation of the virtual reality helmet are bound, 130° or more of the picture can be shot.

Optionally, in some embodiments of the invention, after the perspective view orientation of the third person perspective view and the perspective view orientation of the virtual reality helmet are bound, because the virtual reality helmet may greatly jitter due to change of posture of a user wearing the virtual reality helmet, a picture shot at the third person perspective view also correspondingly jitters. To resolve the problem, in this application, algorithm processing may be performed on rotation of the third person perspective view based on the above, to alleviate picture jitter caused by helmet shaking. In some implementations, the perspective view orientation of the virtual reality helmet includes a roll angle, and the roll angle may be set to a fixed value, to control a roll action of the third person perspective view. A threshold range may be set for the fixed value, and any roll angle within the threshold range may alleviate picture jitter. For example, the fixed value may be set to 0 or set to a small value. This is not specifically limited in this application. In this way, when the roll angle of the virtual reality helmet is the fixed value, the virtual controller may adjust perspective view information of the third person perspective view by performing at least one of the following:

Left-right movement, front-rear movement, left-right rotation, and front-rear rotation. Hence, in the mechanism, the picture shot by the third person perspective view does not jitter in a direction of the roll angle, to reduce dizziness of the user due to jitter of the picture in the direction of the roll angle.

Optionally, in some embodiments of the invention, the third person perspective view may be artificially controlled in addition to being controlled through update of the orientation parameter, to quickly and autonomously perform an adjustment operation on displacement and rotation according to an actual interaction scene of the VR application, to achieve a shooting manner in which the user is a director. For example, displacement or rotation of the third person perspective view in the whole virtual reality application is controlled through an input operation instruction for the virtual controller. Specifically:

The foregoing object inputs a fourth adjustment operation to a terminal device, and then the terminal device may adjust the orientation parameter of the third person perspective view in response to the fourth adjustment operation according to the fourth adjustment operation.

Optionally, in some embodiments of the invention, when the virtual controller adjusts the perspective view orientation of the third person perspective view, adjustment boundaries are infinite when the following items are adjusted:

Left-right movement, front-rear movement, up-down movement, left-right rotation, front-rear rotation, and up-down rotation.

It can be learned that adjustment boundaries of adjusting the perspective view orientation of the third person perspective view are not limited, the perspective view orientation may be adjusted not being bound by physical hardware but limitlessly and freely, to obtain a shooting effect of an extra-large visual field similar to a wide-angle lens and also provide diversified options of VR application video shooting to the user.

Figure 3A:
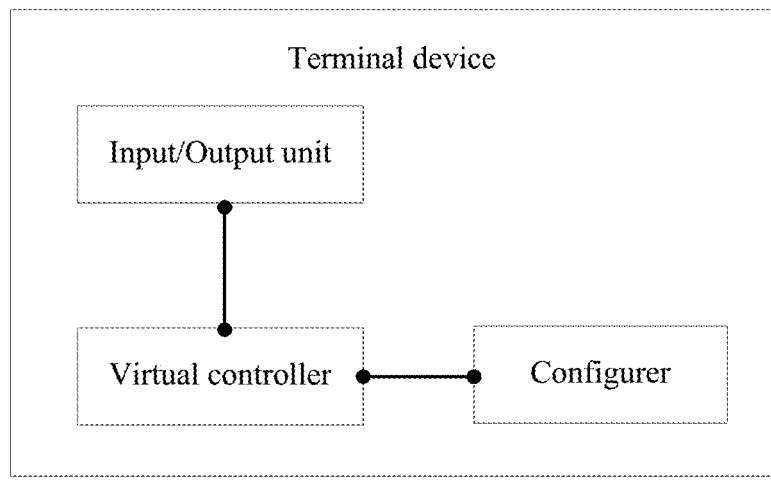
FIG. 3a is a schematic structural diagram of a terminal device in an embodiment of the present application.
Figure 3B:
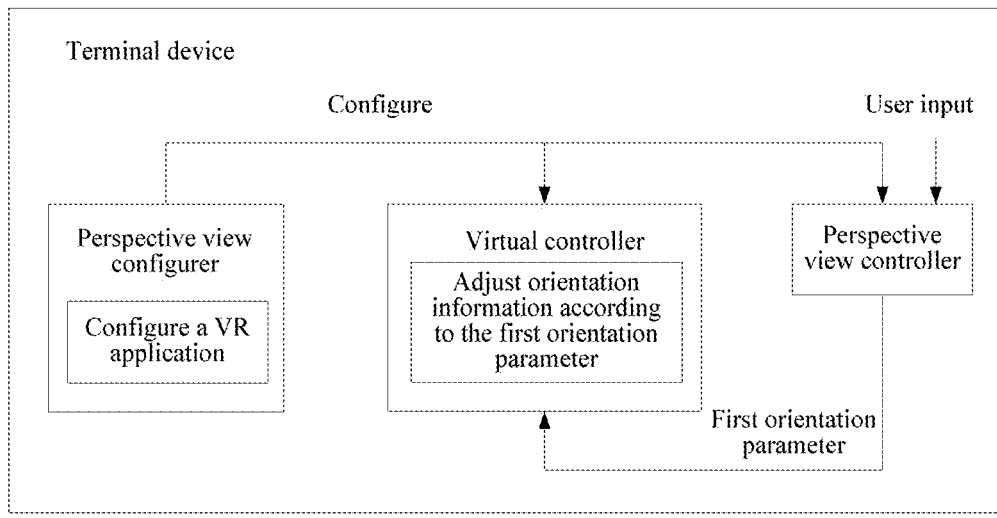
FIG. 3b is another schematic structural diagram of a terminal device in an embodiment of the present application.

Referring to FIG. 3a, a terminal device provided in this application is described below by way of example. The terminal device may include an input/output unit, a configurer, and a virtual controller. The terminal device may further include a perspective view controller, as shown in FIG. 3b. The configurer, the virtual controller, and the perspective view controller may be independent or integrated, and are application plug-ins installed on the terminal device. This is not specifically limited in this application. The terminal device is configured to generate the third person perspective view video of the virtual role in the virtual reality application. The virtual role is a role of an object in the virtual reality application that interacts with the virtual reality application. Functions of the configurer, the virtual controller, and the perspective view controller are described below.

The configurer is configured to configure the virtual reality application, so that the virtual reality application uses the virtual controller as the third person perspective view virtual camera.

The configurer is further configured to configure the virtual controller as the third person perspective view virtual camera of the virtual reality application and configure the third person perspective view. The third person perspective view is a video shooting perspective view of a virtual controller configured as a third person perspective view virtual camera of the virtual reality application. Specifically, when the virtual reality application is run based on a Steam VR platform, the configurer may configure and load a drive of the virtual controller on the Steam VR platform.

The input/output unit is configured to receive a third person perspective view configuration operation.

The virtual controller is configured to: obtain location information of the virtual role in the virtual reality application; and obtain current orientation information of the third person perspective view, the orientation information of the third person perspective view being orientation information of the third person perspective view virtual camera in the virtual reality application.

The virtual controller is further configured to obtain, according to the location information and the current orientation information of the third person perspective view, scene data corresponding to the virtual reality application in which the virtual role is currently located.

The virtual controller is further configured to generate a third person perspective view video of the virtual role currently in the virtual reality application according to the scene data, the current orientation information of the third person perspective view, and posture data of the virtual role.

In some implementations, the orientation information of the third person perspective view virtual camera changes as the location of the virtual role changes.

Compared with the existing technology, in the solution provided in this application, the virtual controller for shooting the third person perspective view video first obtains the location information and the current orientation information of the third person perspective view, obtains the scene data according to the location information and the orientation information of the third person perspective view, and then shoots the third person perspective view video according to the scene data, the current orientation information of the third person perspective view, and posture data of the virtual role. It can be learned that after the solution is used, on one hand, the third person perspective view video may be shot through the virtual controller without being additionally equipped with a hand-held controller, and on the other hand, the third person perspective view video may be omini-directionally shot without involving extra labor and devices and not being limited to physical hardware.

On the other hand, when the VR game is shot, no photographer that has experience in shooting mixed reality is needed to continuously adjust a shooting orientation according to a game process and a player location in a shooting process, but a common player can independently complete the whole operation. A player does not need to synchronously set a green-screen environment and video synchronization, and superpose videos after shooting is completed. It can be known from the above that in the solution of this application, a threshold for players can be lowered, and a whole process of obtaining a video shooting time can be simplified.

Optionally, in some embodiments of the invention, after the virtual controller shoots the current third person perspective view video of the virtual role in the virtual reality application, the input/output unit is further configured to receive a first adjustment operation.

The virtual controller is further configured to adjust the orientation information of the third person perspective view according to a first orientation parameter input by the first adjustment operation and received by the input/output unit, to control displacement and rotation of the third person perspective view virtual camera in the virtual reality application. The first orientation parameter may be input into the virtual controller by the user through the perspective view controller shown in FIG. 3b.

Optionally, in some embodiments of the invention, the input/output unit is further configured to receive a second adjustment operation.

The virtual controller is further configured to adjust a field of view of the virtual controller according to a first instruction input by the second adjustment operation received by the input/output unit, the field of view being a perspective view range for the third person perspective view virtual camera to shoot the third person perspective view video. It can be learned that in this application, when the field of view is adjusted, it is not limited by physical hardware, and the field of view may be randomly increased or decreased, to obtain an appropriate visual field effect.

Optionally, in some embodiments of the invention, the virtual controller is further configured to:

receive a third adjustment operation through the input/output unit; and set the orientation information of the third person perspective view to a fixed value.

Optionally, in some embodiments of the invention, the orientation information includes a perspective view location and a perspective view orientation. Based on the perspective view orientation of the virtual reality helmet, the camera may shoot a picture of the first person perspective view. The configurer is further configured to:

receive a third person perspective view configuration operation through the input/output unit; and bind the perspective view orientation of the third person perspective view and a perspective view orientation of a virtual reality helmet, so that the perspective view orientation of the third person perspective view changes as the perspective view orientation of the virtual reality helmet changes, to obtain a first person perspective view picture, the first person perspective view picture being a picture within a field of view shot by the third person perspective view virtual camera when the virtual role is at the location information, to have a function of the first person perspective view.

Specifically, the perspective view orientation of the third person perspective view and the perspective view orientation of the virtual reality helmet are bound, so that the perspective view orientation of the third person perspective view changes as the perspective view orientation of the virtual reality helmet changes, and the perspective view orientation of the third person perspective view is kept consistent with the perspective view orientation of the virtual reality helmet. In this way, a picture shot by the virtual reality helmet is a first person perspective view picture shot at the first person perspective view. In this way, the first person perspective view can be shot by controlling shooting of the third person perspective view.

Optionally, in this embodiment of the present application, after the perspective view orientation of the third person perspective view and the perspective view orientation of the virtual reality helmet are bound, because the virtual reality helmet may greatly jitter due to change of posture of a user wearing the virtual reality helmet, a picture shot at the third person perspective view also correspondingly jitters. To resolve the problem, in this application, algorithm processing may be performed on rotation of the third person perspective view based on the above, to alleviate picture jitter caused by helmet shaking. In some implementations, the perspective view orientation of the virtual reality helmet includes a roll angle, and the roll angle may be set to a fixed value, to control a roll action of the third person perspective view. A threshold range may be set for the fixed value, and any roll angle within the threshold range may alleviate picture jitter. For example, the fixed value may be set to 0 or set to a small value. This is not specifically limited in this application. In this way, when the roll angle of the virtual reality helmet is the fixed value, the virtual controller may adjust perspective view information of the third person perspective view by performing at least one of the following:

Left-right movement, front-rear movement, left-right rotation, and front-rear rotation. Hence, in the mechanism, the picture shot by the third person perspective view does not jitter in a direction of the roll angle, to reduce dizziness of the user due to jitter of the picture in the direction of the roll angle.

Optionally, in some embodiments of the invention, the third person perspective view may be artificially controlled in addition to being controlled through update of the orientation parameter, to quickly and autonomously perform an adjustment operation on displacement and rotation according to an actual interaction scene of the VR application, to achieve a shooting manner in which the user is a director. For example, displacement or rotation of the third person perspective view in the whole virtual reality application is controlled through an input operation instruction for the virtual controller. Specifically:

The foregoing object inputs a fourth adjustment operation to a terminal device, and then the terminal device may adjust the orientation parameter of the third person perspective view in response to the fourth adjustment operation according to the fourth adjustment operation.

Optionally, in some embodiments of the invention, when the virtual controller adjusts the perspective view orientation of the third person perspective view, adjustment boundaries are infinite when the following items are adjusted:

Left-right movement, front-rear movement, up-down movement, left-right rotation, front-rear rotation, and up-down rotation.

It can be learned that adjustment boundaries of adjusting the perspective view orientation of the third person perspective view are not limited, the perspective view orientation may be adjusted not being bound by physical hardware but limitlessly and freely, to obtain a shooting effect of an extra-large visual field similar to a wide-angle lens and also provide diversified options of VR application video shooting to the user.

For ease of understanding, using an example in which the virtual reality application is implemented based on the Steam VR platform below, the Steam VR platform is installed on the terminal device. For example, the Steam VR platform is installed in a VR client of a computer terminal.

A platform on which the virtual reality application may be run is not limited in this application. In this application, the configurer, the virtual controller, and the perspective view controller may be configured as application plug-ins in the virtual reality application. Functions of the configurer, the virtual controller, and the perspective view controller are described below.

The configurer is mainly configured to configure the Steam VR platform and configure the VR application.

1. When the Steam VR platform is configured, a configuration of the Steam VR platform is modified, so that the Steam VR platform allows loading a drive of a third-party device, so that Steam VR identifies and loads the virtual controller. In addition, according to path requirements of the Steam VR platform, to successfully load the virtual controller, a drive module of the virtual controller further needs to be placed in a specified catalog in the Steam VR platform, so that the virtual controller can be successfully called.

2. When the VR application is configured, the VR application may be made through configuration to accept the virtual controller as a virtual camera of the third person perspective view. Because a mainstream tool currently developing the VR application is Unity, the Steam VR platform provides a development tool kit for a developer of Unity, and the development tool kit includes a script of automatically adding a virtual camera. To successfully call Unity, a configuration file that satisfies a format calling Unity needs to be set at a root catalog of the VR application. An additional third handle (configured to shoot a picture of the third person perspective view) needs to be equipped when the third person perspective view is shot based on the Steam VR platform. An orientation of the third handle is used as an orientation of the virtual camera in the VR application. In this application, the configurer may automatically configure the VR application without the additional third handle, but the configurer performs configuration so that the Steam VR platform uses the virtual controller as the virtual third handle, and uses the orientation of the virtual controller as the orientation of the virtual camera in the VR application. In this way, the virtual controller can achieve a function of using the third physical handle as the virtual camera. Therefore, the VR application can satisfy shooting requirements of the virtual controller.

3. A larger value of FOV configured to configure the virtual controller, that is, FOV configured to configure the third person perspective view indicates a larger visual field range of the third person perspective view and a larger shooting range of the third person perspective view virtual camera. In this way, even if FOV cannot be adjusted due to being limited by hardware at the first person perspective view, an effect of shooting a wider visual field can be achieved provided that FOV is increased according to a requirement. An association relationship between the virtual controller and the perspective view controller may be configured, so that the perspective view controller can provide an orientation parameter for controlling the third person perspective view virtual camera to the virtual controller.

The virtual controller may simulate a VR hand-held handle and may also simulate the third person perspective view virtual camera in the VR application. The virtual controller may be configured to move a location of the third person perspective view and rotate a direction of the third person perspective view. The virtual controller may be a dynamic link library (DLL) file conforming to Open VR drive interface standards. The DLL file is located in a root catalog of the Steam VR platform, and the DLL file is used for driving the third physical handle (that is, the virtual controller) simulated by the Steam VR platform.

In some implementations, a shooting function of the third person perspective view virtual camera may be partially configured in an automatic detection and configuration portion of the configurer, and a shooting function of the third person perspective view virtual camera may be configured and controlled in a preview shooting control portion of the perspective view controller.

Figure 4:
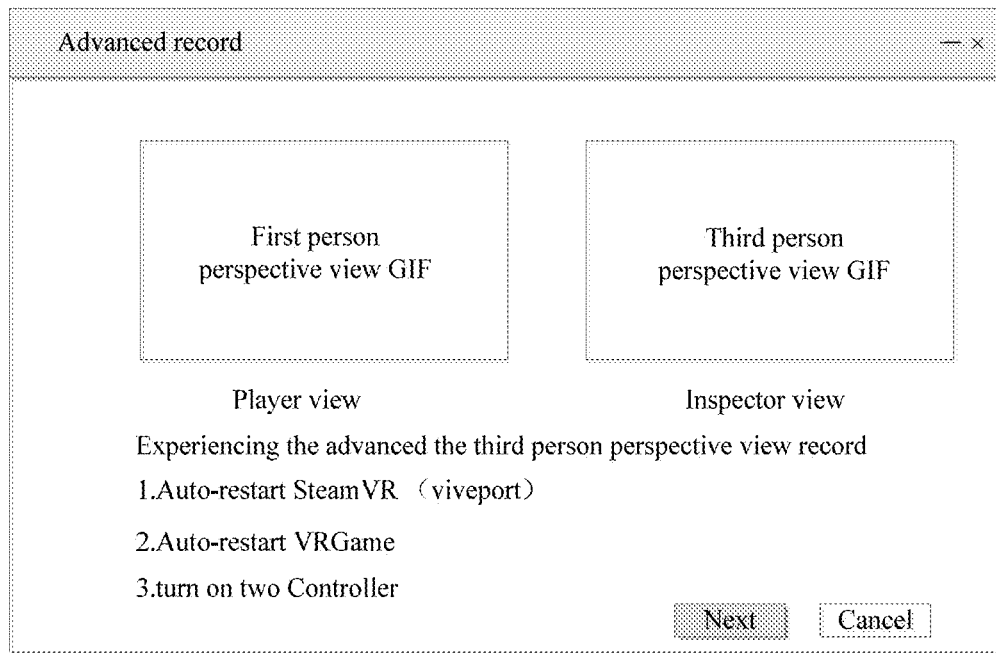
FIG. 4 is a schematic interface diagram of an automatic detection and configuration part in a configurer in an embodiment of the present application.

For the automatic detection and configuration portion of the configurer, refer to an interface shown in FIG. 4. The automatic detection and configuration portion includes an effect comparison area of a first person perspective view video GIF and a third person perspective view video GIF. The first person perspective view video GIF and the third person perspective view video GIF can intuitively present a difference shot at the first person perspective view and the third person perspective view to the user. The automatic detection and configuration portion further includes an information prompt area, to remind a user of an action to be automatically or manually performed, for example, an operation such as left-right movement, up-down movement, and up-down rotation.

Figure 5:
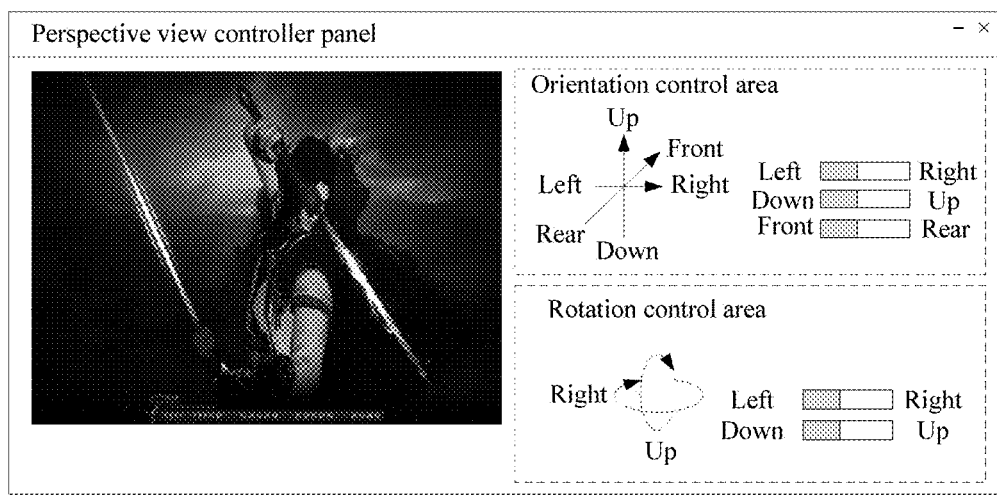
FIG. 5 is a schematic interface diagram of a preview shooting control portion in a perspective view controller in an embodiment of the present application.

For the preview shooting control portion of the perspective view controller, refer to an interface shown in FIG. 5. A preview window is at the left of FIG. 5, and a control area is at the right of FIG. 5. For example, the control area includes an orientation control area and a rotation control area. The orientation control area may mainly adjust three dimensions, that is, up and down, left and right, and front and rear. For example, left-right, up-down, and front-rear displacement and rotation may be implemented by dragging a slider. A boundary of displacement change is not limited in this application.

The rotation control area may mainly adjust rotation of two dimensions, that is, up and down and left and right. For example, left-right rotation for 180° and up-down rotation for 90° may be implemented by dragging a slider. A rotation angle is not limited in this application.

The perspective view controller may provide a user interface (UI) to the user, and the user may adjust the orientation parameter of the virtual controller in real time and conveniently through the UI, that is, adjust the orientation parameter of the third person perspective view virtual camera. For a specific pattern of the perspective view controller, refer to the schematic diagram of a preview shooting control portion shown in FIG. 5. Displacement of the third person perspective view virtual camera in three-dimensional space may be continuously adjusted by the perspective view controller in real time in an up-down, left-right, and front-rear manner. An adjustable boundary is not set for the user to randomly adjust the orientation of the third person perspective view virtual camera. The user may adjust the orientation of the third person perspective view virtual camera through an preview shooting control portion interface shown in FIG. 5.

Figure 6A:
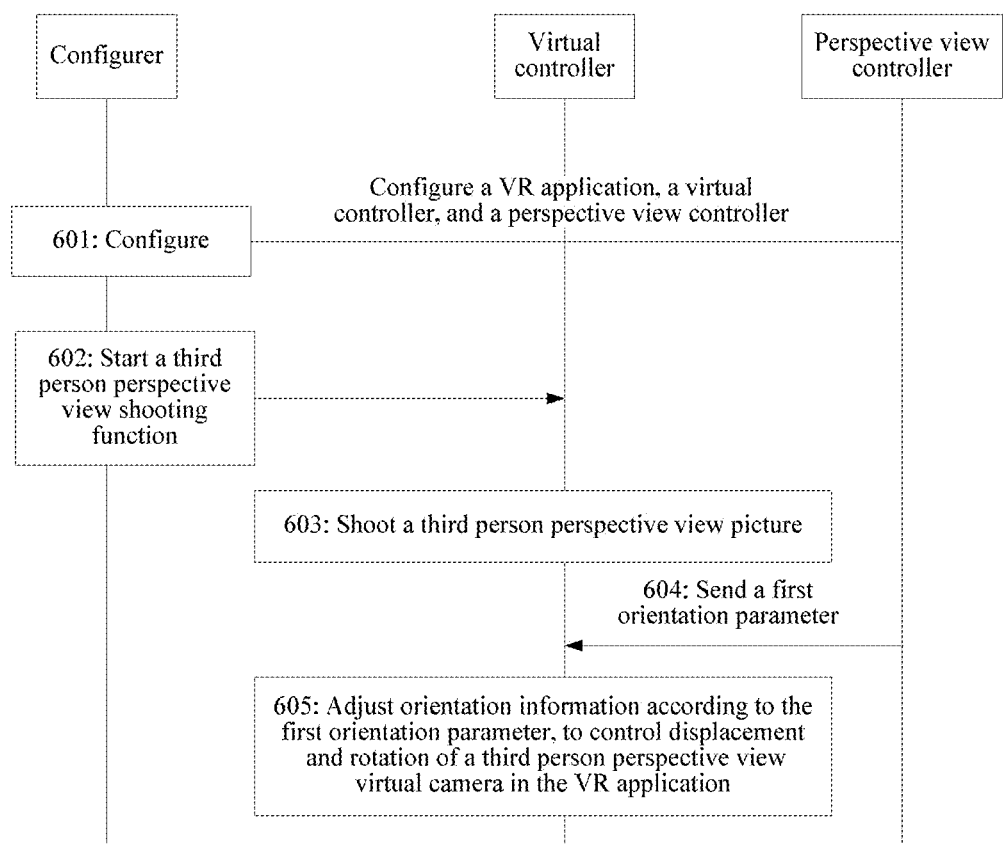
FIG. 6a is another schematic flowchart of a video recording method based on a virtual reality application in an embodiment of the present application.

The perspective view controller, the virtual controller, and the configurer may cooperate to complete shooting of the third person perspective view video and achieve a function of adjusting the perspective view orientation and the perspective view location of the third person perspective view. A specific process is shown in FIG. 6a. The process of FIG. 6a includes:

601: The configurer configures the VR application, the virtual controller, and the perspective view controller.

Specifically, the VR application is configured, so that the VR application accepts the virtual controller as the third person perspective view virtual camera. FOV of the virtual controller may also be configured, and an association relationship between the virtual controller and the perspective view controller is configured.

602: The configurer starts a third person perspective view recording function.

That is, a function of using the virtual controller as the third person perspective view virtual camera is started.

603: The virtual controller records the video of the virtual role from the third person perspective view.

It should be noted that in this step, the user is interacting with the VR application through the terminal device. In an interaction process, as shown in FIG. 6b, the user may click an application icon "virtual controller" on a VR application interface of the terminal device at any time, and select "start third person perspective view recording" in a pull-down menu of the application icon "virtual controller". in this way, the third person perspective view virtual camera can be started to generate the video of the virtual role from the third person perspective view.

Figure 6B:
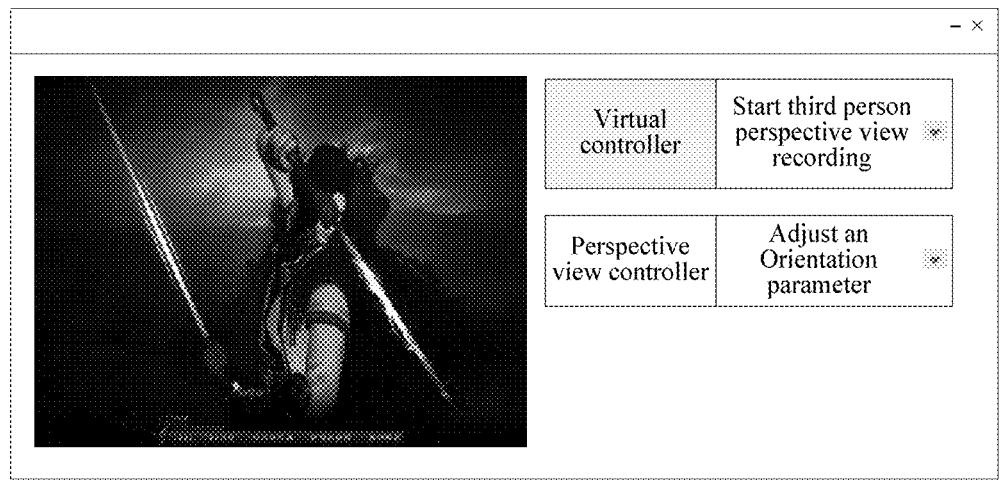
FIG. 6b is a schematic flowchart of an application interface of a VR application in an embodiment of the present application.

In some implementations, when the user interacts with the VR application, if the user wants to shoot the third person perspective view video at a new angle, the user may click an application icon "perspective view controller" shown in FIG. 6b and select "adjust orientation parameter" in a pull-down menu of the application icon "perspective view controller", to enter the schematic interface diagram of a perspective view controller panel shown in FIG. 5. The user may adjust the parameter within a range of the orientation control area or rotation control area in the application interface shown in FIG. 5, and the adjusted value is transferred to the virtual controller, so that the virtual controller may follow change of the orientation parameter of the perspective view controller in real time to control the orientation information of the third person perspective view virtual camera in real time, to adjust a shooting orientation of the third person perspective view, to obtain diversified pictures. Specific steps are as follows:

604: The perspective view controller sends a first orientation parameter to the virtual controller.

605: The virtual controller receives the first orientation parameter and adjusts orientation information of the third person perspective view virtual camera according to the first orientation parameter, to control displacement and rotation of the third person perspective view virtual camera in the VR application.

Figure 6C:
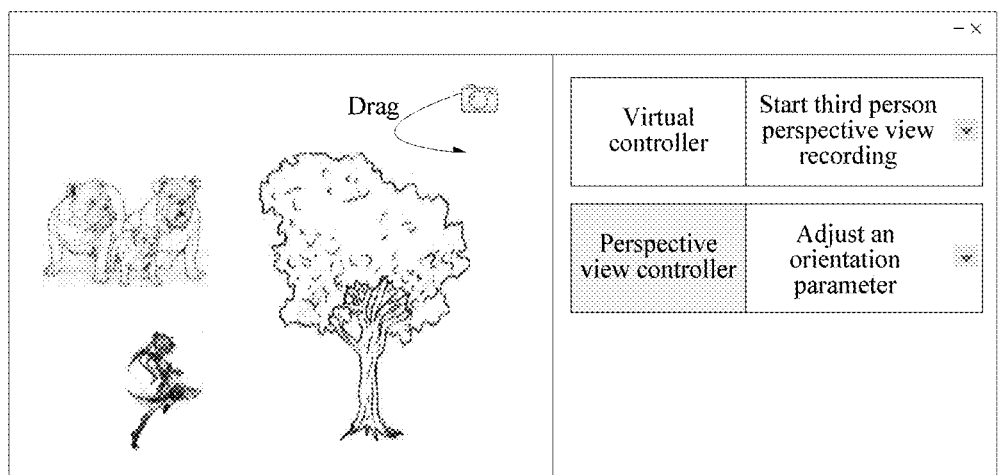
FIG. 6c is another schematic flowchart of an application interface of a VR application in an embodiment of the present application.

In some implementations, the user may not adjust the third person perspective view virtual camera through the perspective view controller and may directly perform operations, such as dragging, touch, click, and sliding, on the VR application interface. In this way, the third person perspective view virtual camera may be more intuitively and flexibly adjusted. As shown in FIG. 6c, the user may directly drag a "camera icon" in the VR application interface shown in FIG. 6c by using a finger, and after dragging, may see that a current video shooting perspective view of the third person perspective view virtual camera changes, and the shot third person perspective view video becomes a scene shown in FIG. 6d.

Figure 6D:
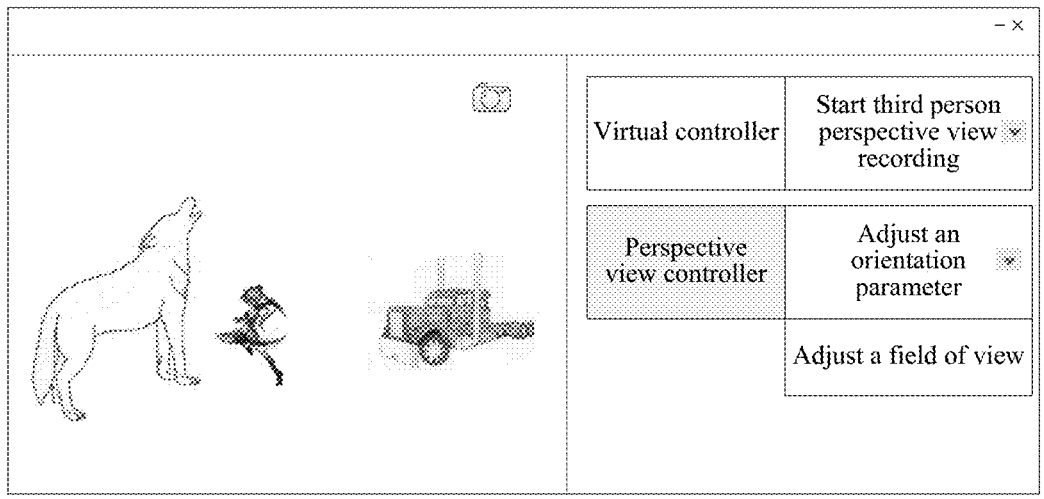
FIG. 6d is another schematic flowchart of an application interface of a VR application in an embodiment of the present application.
Figure 6E:
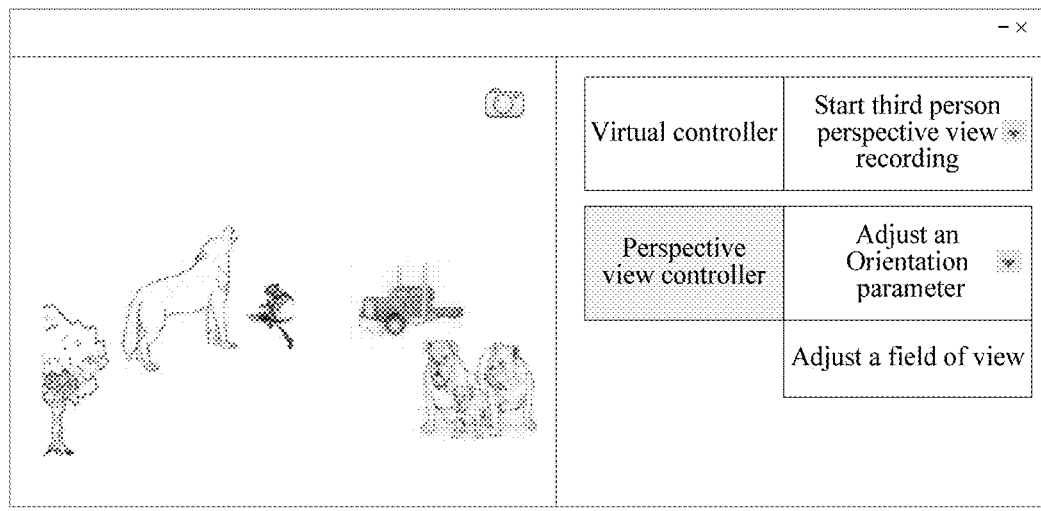
FIG. 6e is another schematic flowchart of an application interface of a VR application in an embodiment of the present application.

In some implementations, when the user interacts with the VR application, if the user wants to shoot the third person perspective view video with a wider visual field, the user may click an application icon "perspective view controller" shown in FIG. 6d and select "adjust field of view" in a pull-down menu of the application icon "perspective view controller", for example, increase the field of view by 20°, so that the visual field shot by the third person perspective view virtual camera in the VR application is enlarged, and an application interface of the enlarged VR application is shown in FIG. 6e.

In some implementations, the perspective view controller, the virtual controller, and the Steam VR platform are associated and may cooperate to complete a function of adjusting the perspective view orientation and the perspective view location of the third person perspective view. A specific process is shown in FIG. 7a.

Figure 7A:
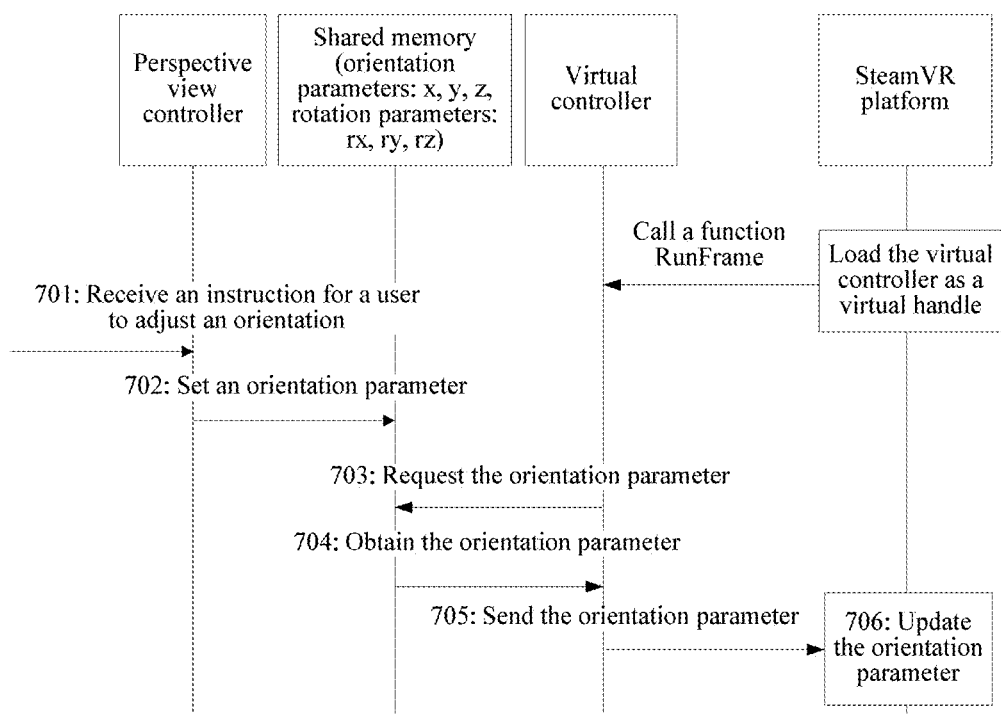
FIG. 7a is a schematic flowchart of adjusting a perspective view location of a perspective view orientation of a third person perspective view in an embodiment of the present application.

In FIG. 7a, after the configurer places the virtual controller in a particular catalog of the Steam VR platform, the Steam VR platform may load the DLL file driving the virtual controller, to load the virtual controller as the virtual handle. The virtual handle is configured to achieve a function of the third person perspective view virtual camera. In this way, when the user shoots the third person perspective view video by using the virtual controller, the user may call the virtual controller to achieve the function of the third person perspective view virtual camera, and then the virtual controller shoots, at the third person perspective view, an interaction scene of the VR application in which the user is located.

Figure 7B:
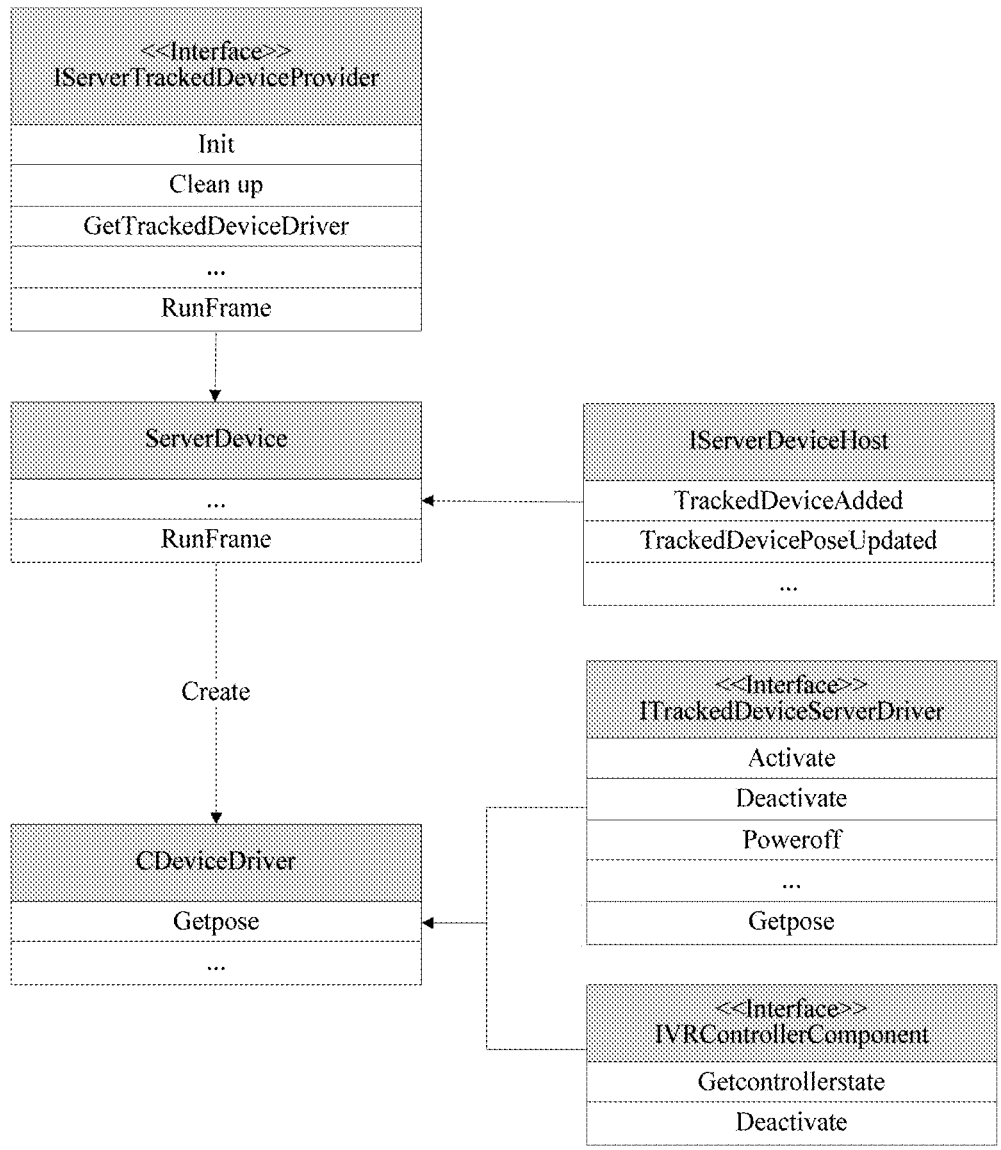
FIG. 7b is a schematic diagram of an interface used by a Steam VR platform to load a virtual controller in an embodiment of the present application.

Specifically, on the premise that the configurer is correctly configured, the Steam VR platform loads the virtual controller. The Steam VR platform may load the virtual controller through interfaces (including IServerTrackedDeviceProvider, IServerDriverHost, ITrackedDeviceServerDriver, and IVRControllerComponent) shown in FIG. 7b. The Steam VR platform may periodically call a function RunFrame in a ServerDriver category to load the virtual controller, and the interface IServerDriverHost initializes the orientation parameter of the virtual controller. In addition, when RunFrame is called, the virtual controller also needs to report the current orientation parameter of the virtual controller. In addition, ITrackedDevicePoseUpdated in the interface IServerDriverHost updates the orientation parameter of the virtual controller. The following describes the orientation parameter for adjusting the third person perspective view virtual camera in detail:

701: After a perspective view controller receives an instruction of adjusting an orientation input by a user through an UI, the user may set an orientation parameter for adjusting the virtual controller in the UI interface of the perspective view controller and stores the orientation parameter in a shared memory.

The shared memory mainly includes an orientation parameter (represented by x, y, and z in a three-axis coordinate system) and a rotation parameter (represented by rx, ry, and rz in a three-axis coordinate system).

702: A virtual controller may request the orientation parameter input by the user in the perspective view controller from the shared memory.

703: The virtual controller obtains the orientation parameter from the shared memory.

704: The virtual controller sends the obtained orientation parameter to a Steam VR platform.

705: The Steam VR platform receives the orientation parameter.

706: The Steam VR platform updates the current orientation parameter of the virtual controller according to the received orientation parameter.

Hence, a displacement adjustment or rotation operation of the third person perspective view virtual camera may be achieved by synchronously updating the orientation parameter. Optionally, the user may also directly adjust the perspective view orientation and the perspective view location of the third person perspective view virtual camera in the VR application interface in a manner of a virtual key, a keyboard, mouse dragging, or the like.

In some implementations, when the third person perspective view is started to shoot a video, the configurer further needs to determine whether configurations of this shooting of the third person perspective view are completed and determine whether configurations of shooting of the third person perspective view are correct. For a specific determining process, refer to the schematic flowchart shown in FIG. 8.

Figure 8:
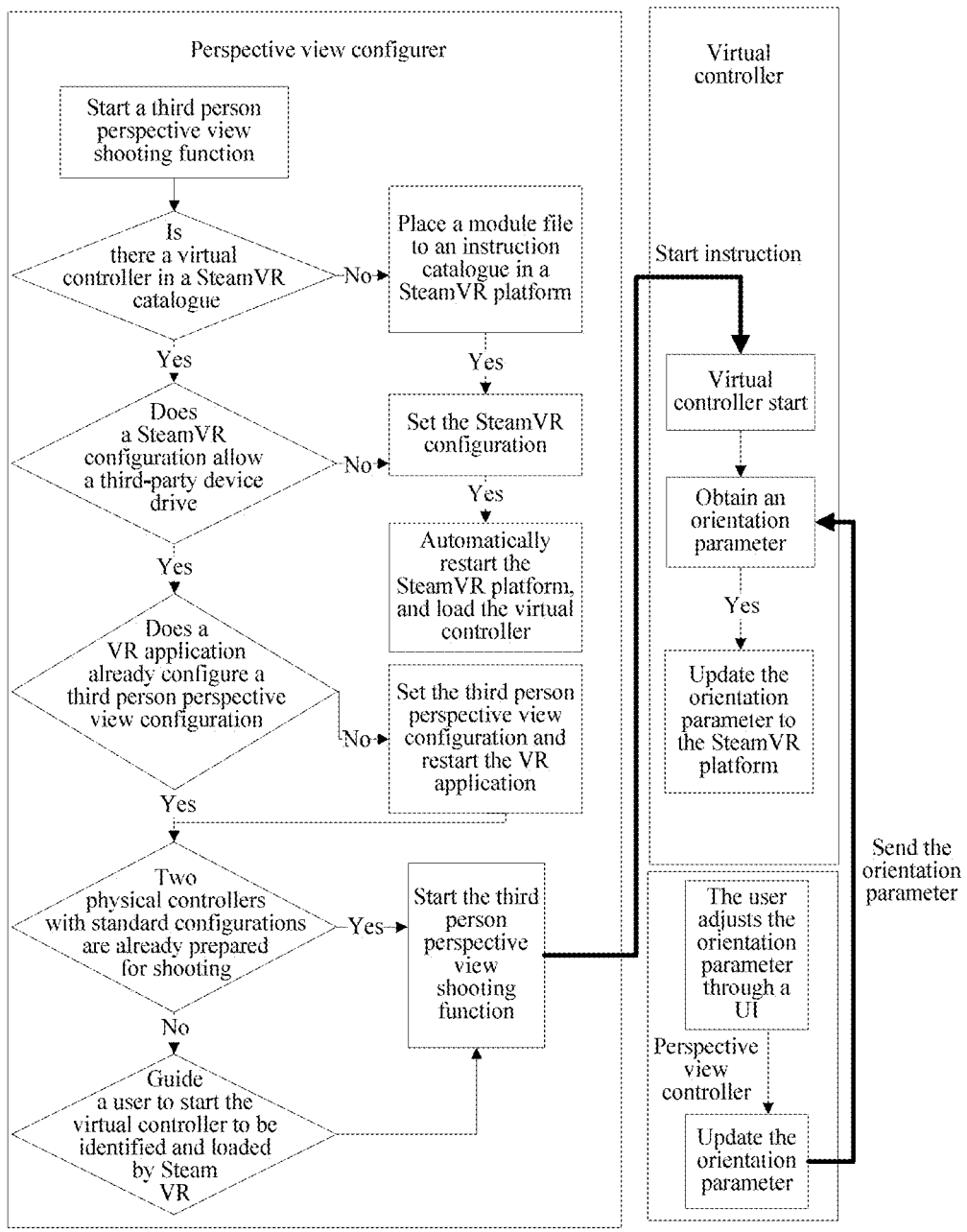
FIG. 8 is a schematic flowchart of starting a third person perspective view virtual camera to shoot a third person perspective picture in an embodiment of the present application.

In FIG. 8, the configurer first determines whether the virtual controller exists in the specified catalog of the Steam VR platform, if not, places a module file to the specified catalog in Steam VR and determines whether a Steam VR configuration allows a third-party device drive, and if yes, determines whether the Steam VR configuration allows a third-party device drive.

If the Steam VR configuration allows the third-party device drive, it is determined whether the VR application has configured a third person perspective view configuration.

If the Steam VR configuration does not allow the third-party device drive, the Steam VR configuration is set, Steam VR is automatically restarted, and the virtual controller is loaded in Steam VR. Then, whether the VR application has configured a third person perspective view configuration is determined.

If the VR application has configured a third person perspective view configuration, whether two physical controllers with standard configurations are already prepared for shooting a picture of the VR application.

If the VR application does not configure a third person perspective view configuration, the third person perspective view configuration is set, and the VR application is restarted. Then, whether two physical controllers of standard configurations are prepared is determined.

If it is determined that the two physical controllers with standard configurations are prepared, a start instruction is sent to the virtual controller, to start the virtual controller, to start a third person perspective view shooting function of the third person perspective view virtual camera. If it is determined that the two physical controllers with standard configurations are not prepared for shooting a picture of the VR application, the user is guided to first start the two physical controllers, and after it is detected that the two physical controllers are prepared, the virtual controller is started, so that the virtual controller is identified by the Steam VR platform, to start the third person perspective view shooting function.

After the virtual controller is started, the third person perspective view video may start to be shot. In a process in which the user interacts with the VR application, after the user adjusts the orientation parameter of the third person perspective view virtual camera through the UI, the perspective view controller updates the orientation parameter in the shared memory and then sends the updated orientation parameter to the virtual controller, so that the virtual controller updates the orientation parameter to the Steam VR platform after receiving the updated orientation parameter from the perspective view controller. In this way, the terminal device can shoot the third person perspective view video with the updated orientation parameter. It should be noted that update of the orientation parameter in this embodiment of this application may be triggered based on user input or may be triggered based on change of the location information of the user in the process in which the user interacts with the VR application. This is not specifically limited in this application.

The terminal device in this embodiment of the present application is described above from the perspective of modularized functional entities, and the terminal device in this embodiment of the present application is described below from the perspective of hardware processing.

Figure 9:
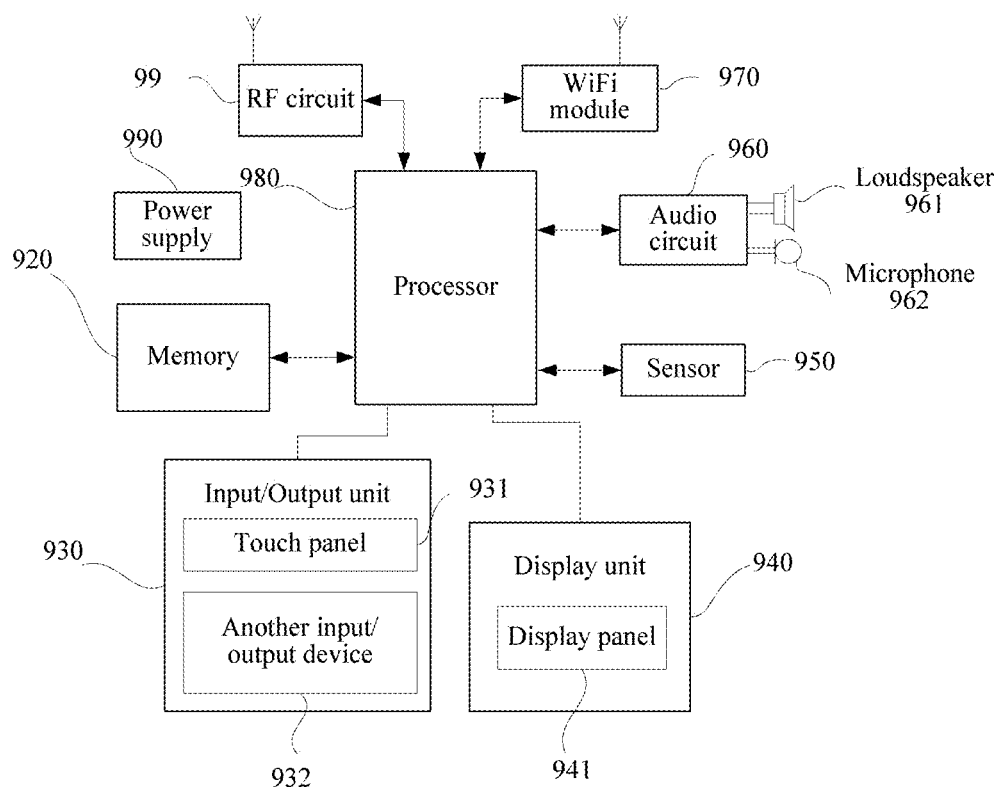
FIG. 9 is another schematic structural diagram of a terminal device in an embodiment of the present application.

The embodiment of the present application further provides another terminal device, as shown in FIG. 9, and for convenience of description, only parts related to the embodiment of the present application relevant are shown. For specific technical details that are not disclosed, refer to the method part of the embodiments of the present application. The terminal device may be any terminal device including a PC, a tablet computer, a personal digital assistant (PDA), a point of sales (POS), a vehicle-mounted computer, and the like. An example in which the terminal device is a PC is used:

FIG. 9 is a block diagram of a structure of a part of a PC related to a terminal device according to an embodiment of the present application. Referring to FIG. 9, the PC includes: components such as a radio frequency (Radio Frequency, RF) circuit 99, a memory 920, an input unit 930, a display unit 940, a sensor 950, an audio circuit 960, a wireless fidelity (wireless fidelity, WiFi) module 970, a processor 980, and a power supply 990. A person skilled in the art may understand that the structure of the PC shown in FIG. 9 does not constitute a limitation to the PC, and the PC may include more components or fewer components than those shown in the figure, or some components may be combined, or a different component deployment may be used.

The following specifically describes the components of the PC with reference to FIG. 9.

The RF circuit 99 may be configured to receive and send signals during an information receiving and sending process or a call process. Specifically, the RF circuit 99 receives downlink information from a base station, then delivers the downlink information to the processor 980 for processing, and sends related uplink data to the base station. Usually, the RF circuit 99 includes, but is not limited to, an antenna, at least one amplifier, a transceiver, a coupler, a low noise amplifier (LNA), and a duplexer. In addition, the RF circuit 99 may also communicate with a network and another device through wireless communication. The wireless communication may use any communication standard or protocol, including but not limited to: Global System for Mobile Communications (GSM), General Packet Radio Service (GPRS), Code Division Multiple Access (CDMA), Wideband Code Division Multiple Access (WCDMA), Long Term Evolution (LTE), email, and a short messaging service (SMS).

The memory 920 may be configured to store a software program and module. The processor 980 runs the software program and module stored in the memory 920, to implement various functional applications and data processing of the PC. The memory 920 may mainly include a program storage area and a data storage area. The program storage area may store an operating system, an application program required by at least one function (such as a sound playback function and an image display function), and the like. The data storage area may store data (such as audio data and an address book) created according to use of the PC, and the like. In addition, the memory 920 may include a high-speed random access memory, and may further include a non-volatile memory such as at least one magnetic disk storage device or a flash memory device, or another volatile solid storage device.

The input unit 930 may be configured to receive input digit or character information, and generate a keyboard signal input related to the user setting and function control of the PC. Specifically, the input/output unit 930 may include a touch panel 931 and another input/output device 932. The touch panel 931 may also be referred to as a touchscreen, and may collect a touch operation of a user on or near the touch panel (such as an operation of a user on or near the touch panel 931 by using any suitable object or attachment, such as a finger or a stylus), and drive a corresponding connection apparatus according to a preset program. Optionally, the touch panel 931 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 980. In addition, the touch controller can receive a command sent by the processor 980 and execute the command. In addition, the touch panel 931 may be a resistive, capacitive, infrared, or surface sound wave type touch panel. In addition to the touch panel 931, the input unit 930 may further include the another input device 932. Specifically, the another input device 932 may include, but is not limited to, one or more of a physical keyboard, a functional key (such as a volume control key or a switch key), a track ball, a mouse, and a joystick.

The display unit 940 may be configured to display information input by the user or information provided for the user, and various menus of the PC. The display unit 940 may include a display panel 941. Optionally, the display panel 941 may be configured by using a liquid crystal display (LCD), an organic light-emitting diode (OLED), or the like. Further, the touch panel 931 may cover the display panel 941. After detecting a touch operation on or near the touch panel 931, the touch panel 931 transfers the touch operation to the processor 980, to determine a type of a touch event. Then, the processor 980 provides a corresponding visual output on the display panel 941 according to the type of the touch event. Although, in FIG. 9, the touch panel 931 and the display panel 941 are used as two separate parts to implement input and output functions of the PC, in some embodiments, the touch panel 931 and the display panel 941 may be integrated to implement the input and output functions of the PC.

The PC may further include at least one sensor 950 such as an optical sensor, a motion sensor, and other sensors. Specifically, the optical sensor may include an ambient light sensor and a proximity sensor. The ambient light sensor may adjust luminance of the display panel 941 according to brightness of the ambient light. The proximity sensor may switch off the display panel 941 and/or backlight when the PC is moved to the ear. As one type of motion sensor, an acceleration sensor may detect magnitude of accelerations in various directions (generally on three axes), may detect magnitude and a direction of the gravity when static, and may be applied to an application that recognizes the attitude of the PC (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the PC, are not further described herein.

The audio circuit 960, a loudspeaker 961, and a microphone 962 may provide audio interfaces between the user and the PC. The audio circuit 960 may convert received audio data into an electric signal and transmit the electric signal to the loudspeaker 961. The loudspeaker 961 converts the electric signal into a sound signal for output. On the other hand, the microphone 962 converts a collected sound signal into an electric signal. The audio circuit 960 receives the electric signal and converts the electric signal into audio data, and outputs the audio data to the processor 980 for processing. Then, the processor 980 sends the audio data to, for example, another PC by using the RF circuit 99, or outputs the audio data to the memory 920 for further processing.

Wi-Fi belongs to a short distance wireless transmission technology. The PC may help, by using the wireless communications unit 970, the user to receive and send e-mails, browse a webpage, access streaming media, and so on, which provides wireless broadband Internet access for the user. Although FIG. 9 shows the WiFi module 970, it may be understood that the WiFi module 970 is not a necessary component of the PC, and when required, the WiFi module 970 may be omitted as long as the scope of the essence of the present disclosure is not changed.

The processor 980 is the control center of the PC, and is connected to various parts of the PC by using various interfaces and lines. By running or executing the software program and/or module stored in the memory 920, and invoking data stored in the memory 920, the processor 980 performs various functions and data processing of the PC, thereby performing overall monitoring on the PC. Optionally, the processor 980 may include one or more processing units. Preferably, the processor 980 may integrate an application processor and a modem processor. The application processor mainly processes an operating system, a user interface, an application program, and the like. The modem processor mainly processes wireless communication. It may be understood that the foregoing modem processor may alternatively not be integrated into the processor 980.

The PC further includes the power supply 990 (such as a battery) for supplying power to the components. Preferably, the power supply may be logically connected to the processor 980 by using a power management system, thereby implementing functions such as charging, discharging and power consumption management by using the power management system.

Although not shown in the figure, the PC may further include a camera, a Bluetooth module, and the like, which are not further described herein.

In this embodiment of the present application, the processor 980 included in the PC further controls to perform an operation performed by the foregoing terminal device.

In the foregoing embodiments, the description of each embodiment has respective focuses. For a part that is not described in detail in an embodiment, reference may be made to related descriptions in other embodiments.

It may be clearly understood by persons skilled in the art that for convenience and brevity of description, for a detailed working process of the foregoing system, apparatus, and module, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division of the modules is merely logical function division and may be other division manners during actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all modules thereof may be selected based on an actual requirement, to implement an objective of the solution in this embodiment.

In addition, functional modules in the embodiments of in this application may be integrated into one processing module, or each of the modules may exist alone physically, or two or more modules are integrated into one module. The integrated module may be implemented in a form of hardware, or may be implemented in a form of a software functional module. When the integrated module is implemented in the form of a software functional module and sold or used as an independent product, the integrated module may be stored in a computer-readable storage medium.

All or some of the foregoing embodiments may be implemented through software, hardware, firmware, or any combination thereof. When the embodiments are implemented by using software, all or some of the embodiments may be implemented in a form of a computer program product.

The computer program product includes one or more computer instructions. When the computer program instructions are loaded and executed on a computer, all or some of the processes or functions according to the embodiments of the present application are produced. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. The computer readable storage medium may be any available medium capable of being stored by a computer or include one or more data storage devices integrated by an available medium, such as a communications device and a data center. The available medium may be a magnetic medium (such as a floppy disk, a hard disk, or a magnetic tape), an optical medium (such as a DVD), a semiconductor medium (such as a solid state disk (SSD)) or the like.

The technical solutions provided in this application are described above in detail. Although the principles and implementations of this application are described by using specific examples in this application, the descriptions of the foregoing embodiments are merely intended to help understand the method and the core idea of the method of this application. Meanwhile, a person of ordinary skill in the art may make modifications to the specific implementations and application ranges according to the idea of this application. In conclusion, the content of this specification should not be construed as a limitation on this application.

What is claimed is:

1. A video recording method based on a virtual reality application, the method being performed at a computing device having one or more processors and memory storing programs to be executed by the one or more processors, and the video recording method comprising:
    configuring a third person perspective view of a target virtual object, the third person perspective view being a video shooting perspective view of a virtual controller configured as a third person perspective view virtual camera of the virtual reality application;
    obtaining location information of the target virtual object in the virtual reality application;
    obtaining current orientation information of the third person perspective view, the current orientation information of the third person perspective view being orientation information of the third person perspective view virtual camera in the virtual reality application, the orientation information comprises a perspective view orientation;
    obtaining, according to the location information of the target virtual object and the current orientation information of the third person perspective view, scene data corresponding to the virtual reality application in which the target virtual object is currently located; and
    capturing and displaying actions of the target virtual object in the virtual reality application according to the scene data, including:
    binding the perspective view orientation of the third person perspective view to a first person perspective view orientation of a virtual reality helmet of the target virtual object according to a third person perspective view configuration operation, so that the perspective view orientation of the third person perspective view changes as the first person perspective view orientation of the virtual reality helmet changes, to obtain a first person perspective view picture, the first person perspective view picture being a picture within a field of view shot by the third person perspective view virtual camera based on a current location information of the target virtual object.

2. The method according to claim 1, further comprising:
    before configuring the third person perspective view:
        configuring the virtual reality application, so that the virtual reality application uses the virtual controller as the third person perspective view virtual camera.

3. The method according to claim 2, wherein the orientation information of the third person perspective view virtual camera changes as a location of the target virtual object changes.

4. The method according to claim 1, further comprising:
    receiving a first adjustment operation; and
    adjusting the orientation information of the third person perspective view according to a first orientation parameter defined by the first adjustment operation, to control displacement and rotation of the third person perspective view virtual camera in the virtual reality application.

5. The method according to claim 1, further comprising:
    receiving a second adjustment operation; and
    adjusting a field of view of the virtual controller according to a first instruction defined by the second adjustment operation, the field of view being a perspective view range for the third person perspective view virtual camera to shoot the video from the third person perspective view.

6. The method according to claim 5, further comprising:
    receiving a third adjustment operation; and
    setting the orientation information of the third person perspective view to a fixed value according to the third adjustment operation.

7. A computing device for recording interactions of a target virtual object with other virtual objects in a virtual reality application from a third person perspective view in the virtual reality application, the computing device comprising one or more processors, memory coupled to the one or more processors and a plurality of programs stored in the memory that, when executed by the one or more processors, cause the computing device to perform a plurality of operations comprising:

configuring a third person perspective view of a target virtual object, the third person perspective view being a video shooting perspective view of a virtual controller configured as a third person perspective view virtual camera of the virtual reality application;

obtaining location information of the target virtual object in the virtual reality application;

obtaining current orientation information of the third person perspective view, the current orientation information of the third person perspective view being orientation information of the third person perspective view virtual camera in the virtual reality application, the orientation information comprises a perspective view orientation;

obtaining, according to the location information of the target virtual object and the current orientation information of the third person perspective view, scene data corresponding to the virtual reality application in which the target virtual object is currently located; and capturing and displaying actions of the target virtual object in the virtual reality application according to the scene data, including:

binding the perspective view orientation of the third person perspective view to a first person perspective view orientation of a virtual reality helmet of the target virtual object according to a third person perspective view configuration operation, so that the perspective view orientation of the third person perspective view changes as the first person perspective view orientation of the virtual reality helmet changes, to obtain a first person perspective view picture, the first person perspective view picture being a picture within a field of view shot by the third person perspective view virtual camera based on a current location information of the target virtual object.

8. The computing device according to claim 7, wherein the plurality of operations further comprise:

before configuring the third person perspective view:
configuring the virtual reality application, so that the virtual reality application uses the virtual controller as the third person perspective view virtual camera.

9. The computing device according to claim 8, wherein the orientation information of the third person perspective view virtual camera changes as a location of the target virtual object changes.

10. The computing device according to claim 7, wherein the plurality of operations further comprise:

receiving a first adjustment operation; and
adjusting the orientation information of the third person perspective view according to a first orientation parameter defined by the first adjustment operation, to control displacement and rotation of the third person perspective view virtual camera in the virtual reality application.

11. The computing device according to claim 7, wherein the plurality of operations further comprise:

receiving a second adjustment operation; and adjusting a field of view of the virtual controller according to a first instruction defined by the second adjustment operation, the field of view being a perspective view range for the third person perspective view virtual camera to shoot the video from the third person perspective view.

12. The computing device according to claim 11, wherein the plurality of operations further comprise:

receiving a third adjustment operation; and
setting the orientation information of the third person perspective view to a fixed value according to the third adjustment operation.

13. A non-transitory computer readable storage medium storing a plurality of machine readable instructions for recording interactions of a target virtual object with other virtual objects in a virtual reality application from a third person perspective view in the virtual reality application in connection with a computing device having one or more processors, wherein the plurality of machine readable instructions, when executed by the one or more processors, cause the computing device to perform a plurality of operations including:

configuring a third person perspective view of a target virtual object, the third person perspective view being a video shooting perspective view of a virtual controller configured as a third person perspective view virtual camera of the virtual reality application;

obtaining location information of the target virtual object in the virtual reality application;

obtaining current orientation information of the third person perspective view, the current orientation information of the third person perspective view being orientation information of the third person perspective view virtual camera in the virtual reality application, the orientation information comprises a perspective view orientation;

obtaining, according to the location information of the target virtual object and the current orientation information of the third person perspective view, scene data corresponding to the virtual reality application in which the target virtual object is currently located; and capturing and displaying actions of the target virtual object in the virtual reality application according to the scene data, including:

binding the perspective view orientation of the third person perspective view to a first person perspective view orientation of a virtual reality helmet of the target virtual object according to a third person perspective view configuration operation, so that the perspective view orientation of the third person perspective view changes as the first person perspective view orientation of the virtual reality helmet changes, to obtain a first person perspective view picture, the first person perspective view picture being a picture within a field of view shot by the third person perspective view virtual camera based on a current location information of the target virtual object.

14. The non-transitory computer readable storage medium according to claim 13, wherein the plurality of operations further comprise:

before configuring the third person perspective view:
configuring the virtual reality application, so that the virtual reality application uses the virtual controller as the third person perspective view virtual camera.

15. The non-transitory computer readable storage medium according to claim 14, wherein the orientation information of the third person perspective view virtual camera changes as a location of the target virtual object changes.

16. The non-transitory computer readable storage medium according to claim 13, wherein the plurality of operations further comprise:
   receiving a first adjustment operation; and
   adjusting the orientation information of the third person perspective view according to a first orientation parameter defined by the first adjustment operation, to control displacement and rotation of the third person perspective view virtual camera in the virtual reality application.

17. The non-transitory computer readable storage medium according to claim 13, wherein the plurality of operations further comprise:
   receiving a second adjustment operation; and
   adjusting a field of view of the virtual controller according to a first instruction defined by the second adjustment operation, the field of view being a perspective view range for the third person perspective view virtual camera to shoot the video from the third person perspective view.

18. The non-transitory computer readable storage medium according to claim 17, wherein the plurality of operations further comprise:
   receiving a third adjustment operation; and
   setting the orientation information of the third person perspective view to a fixed value according to the third adjustment operation.

19. The method according to claim 1, further comprising adjusting a field of view (FOV) of the third person perspective view so that a FOV wider than a picture visual field shot by the virtual reality helmet at the same perspective view orientation is obtained.

20. The method according to claim 1, further comprising alleviating picture jitter caused by the virtual reality helmet shaking by performing algorithm processing on a rotation of the third person perspective view.

* * * * *